United States Patent
Allsop et al.

(10) Patent No.: US 6,170,657 B1
(45) Date of Patent: *Jan. 9, 2001

(54) PORTABLE COMPACT DISC STORAGE CONTAINER

(75) Inventors: James D. Allsop; Eivind Clausen, both of Bellingham, WA (US)

(73) Assignee: Allsop, Inc., Bellingham, WA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/416,171

(22) Filed: Oct. 11, 1999

(51) Int. Cl.[7] .................................................. B65D 85/57
(52) U.S. Cl. ........................................ 206/308.1; 206/311
(58) Field of Search .............................. 206/232, 308.1, 206/307, 307.1, 309, 311

(56) References Cited

U.S. PATENT DOCUMENTS

| 5,209,593 | * | 5/1993 | Ros ........................................ 206/472 |
| 5,620,271 | * | 4/1997 | Bergh et al. ................... 206/308.1 X |
| 5,715,938 | * | 2/1998 | Cheris et al. ...................... 206/308.1 |

OTHER PUBLICATIONS

*Computer Accessories –Consumer Electronics*, Allsop Product Catalog, Bellingham, WA, Jan. 1998, p. 9.
*Product Catalog*, Allsop, Inc., Bellingham, WA, 1999, pp. 17 and 27.
*Storage –Transportable*, 1999 Proprietary Study, Allsop, Inc., Bellingham, WA, 1999, 1 page.

* cited by examiner

*Primary Examiner*—Jim Foster
(74) *Attorney, Agent, or Firm*—Christensen O'Connor Johnson Kindness PLLC

(57) ABSTRACT

A portable storage container (20) for storing substantially planar media is provided. The storage container includes first and second shell halves (22) and (24), wherein each shell half has an exterior, an interior, and a perimeter rim portion. A hinge connector (26) extends between a portion of the first and second shell halves to foldably couple the first and second shell half, such that the first and second shell halves are selectably foldable between a closed position, wherein the interiors of the first and second shell halves oppose each other, and an open position. The storage container also includes an alignment assembly (54) disposed on the portable storage container to facilitate alignment of the perimeter rim portions of the first and second shell halves in the closed position. The storage container also includes a first envelope (36) sized to be selectively received within at least one of either the first or second shell halves, wherein the first envelope is adapted to store a substantially planar media.

22 Claims, 5 Drawing Sheets

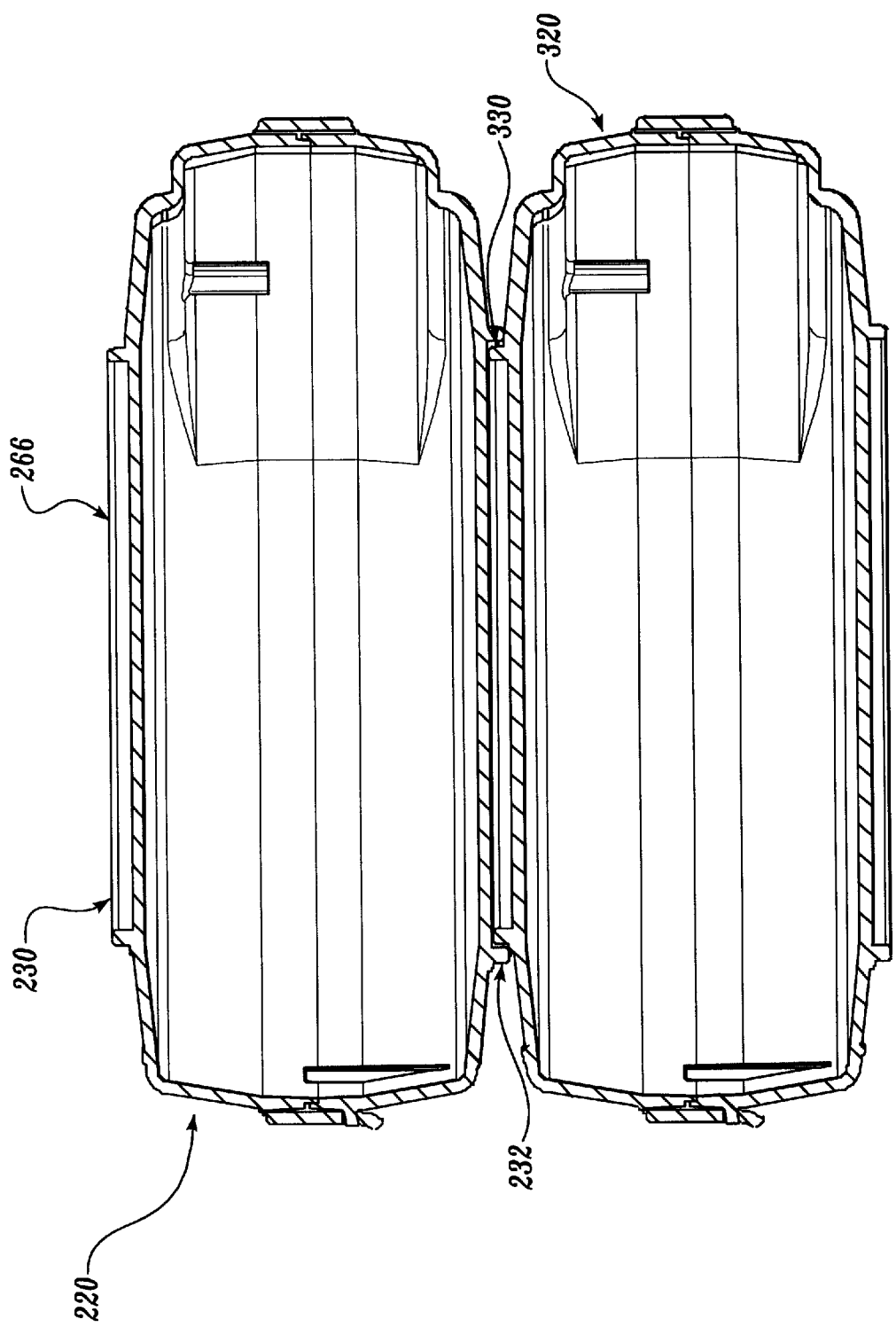

PORTABLE COMPACT DISC STORAGE CONTAINER

FIELD OF THE INVENTION

The present invention relates to containers for holding electronic media storage devices, and more specifically, to containers for holding compact discs that store digitized electronic data.

BACKGROUND OF THE INVENTION

The size and types of media that store information in formats suitable for use by electronic devices has increased in recent years. For example, the computer industry previously placed primary reliance on magnetic discs and tape for storage and retrieval of information in digital format. Now, compact discs (CD) have become widely used in the computer and entertainment industry for the same purpose. Additionally, other types of media have also been formatted to store audio and visual data and are commonly known as digital video discs (DVDs). DVDs and CDs are typically planar disc-shaped media.

Currently, containers for holding such electronic data storage devices include a fabric shell sized to receive a media disc, such as a CD, therein. Such containers also include a zipper around the perimeter to fasten the container. Although such containers are effective as a disc storage device, they are not without their problems. As an example, because the container is made of a fabric, such containers do not effectively protect the disc stored therein from damage. Further, such fabric containers are easily soiled. Finally, fabric containers with a zipper latch do not provide a tight seal when the container is closed. As a result, the disc stored within the container is subject to damage, such as a scratch, from dust and dirt particles.

Thus, there exists a need for a portable compact disc storage container that provides a safe storage environment for discs and is aesthetically pleasing.

SUMMARY OF THE INVENTION

In accordance with the present invention, a portable storage container for storing substantially planar media is provided. The storage container includes first and second shell halves, each shell half having an exterior, an interior and a perimeter rim portion. A connector extends between a portion of the first and second shell halves to foldably couple the first and second shell halves. The first and second shell halves are selectively foldable between a closed position, wherein the interiors of the first and second shell halves oppose each other, and an open position. The storage container further includes an alignment assembly disposed on the portable storage container to facilitate alignment of the perimeter rim portions of the first and second shell halves in the closed position. The storage container also includes a first envelope sized to be selectively received within at least one of either the first or second shell halves. The first envelope is adapted to store a substantially planar media.

In accordance with other aspects of this invention, the storage container also includes a sealing surface fastened to one of the perimeter rim portions of either the first or second shell halves. The sealing surface is sized to seal and receive the perimeter rim portion of the other of the first or second shell halves.

In accordance with additional aspects of this invention, the alignment assembly includes a first peg extending from the connector and a first slot integrally formed with the perimeter rim portion of one of the first or second shell halves. The first slot is sized to receive the first peg therein when the first and second shell halves are in the closed position to ensure alignment of the first and second shell halves and facilitate closing of the first and second shell halves.

In accordance with still yet other aspects of this invention, the first envelope includes a sleeve fastened to one side of the first envelope by a seam. The sleeve is sized to receive a substantially planar media between the one side of the first envelope and the sleeve. The sleeve includes first and second notches located a predetermined distance from the seam. The first and second notches are located on opposite sides of the sleeves and are adapted to permit repeated deposit and removal of a substantially planar media from the first envelope.

In still yet other aspects of this invention, the storage container further includes first and second pegs disposed within the interior of the first and second shell halves and the pegs are sized to selectively fasten first and second envelopes within the storage container. Further, the storage container includes a first gripping surface fastened to the exterior of at least one of the first or second shell halves.

A portable storage container formed in accordance with the present invention has several advantages over storage containers used in the past. First, the sealing surface fastened to one of the perimeter end portions provides an increase seal between the first and second shell halves, thereby minimizing the risk of damage to a disc stored therein due to particles of dust or dirt. Further, the gripping surface permits the storage container to be placed securely on a surface, such as the dashboard of an automobile. Additionally, because the gripping surface and sealing surface are comolded with the storage container, such a storage container is simpler to manufacture. Finally, the gripping surface provides a tactile feel to the end user for gripping the product. As a result, a portable storage container formed in accordance with the present invention is simpler to manufacture, provides a safer storage environment for a disc, and is more reliable than currently available storage containers.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 5. is a cross-sectional side view of two portable storage containers formed in accordance with the present invention showing the portable storage containers in a stacked position.

DETAILED DESCRIPTION OF THE PREFERRED EMBODIMENTS

Figure 1:
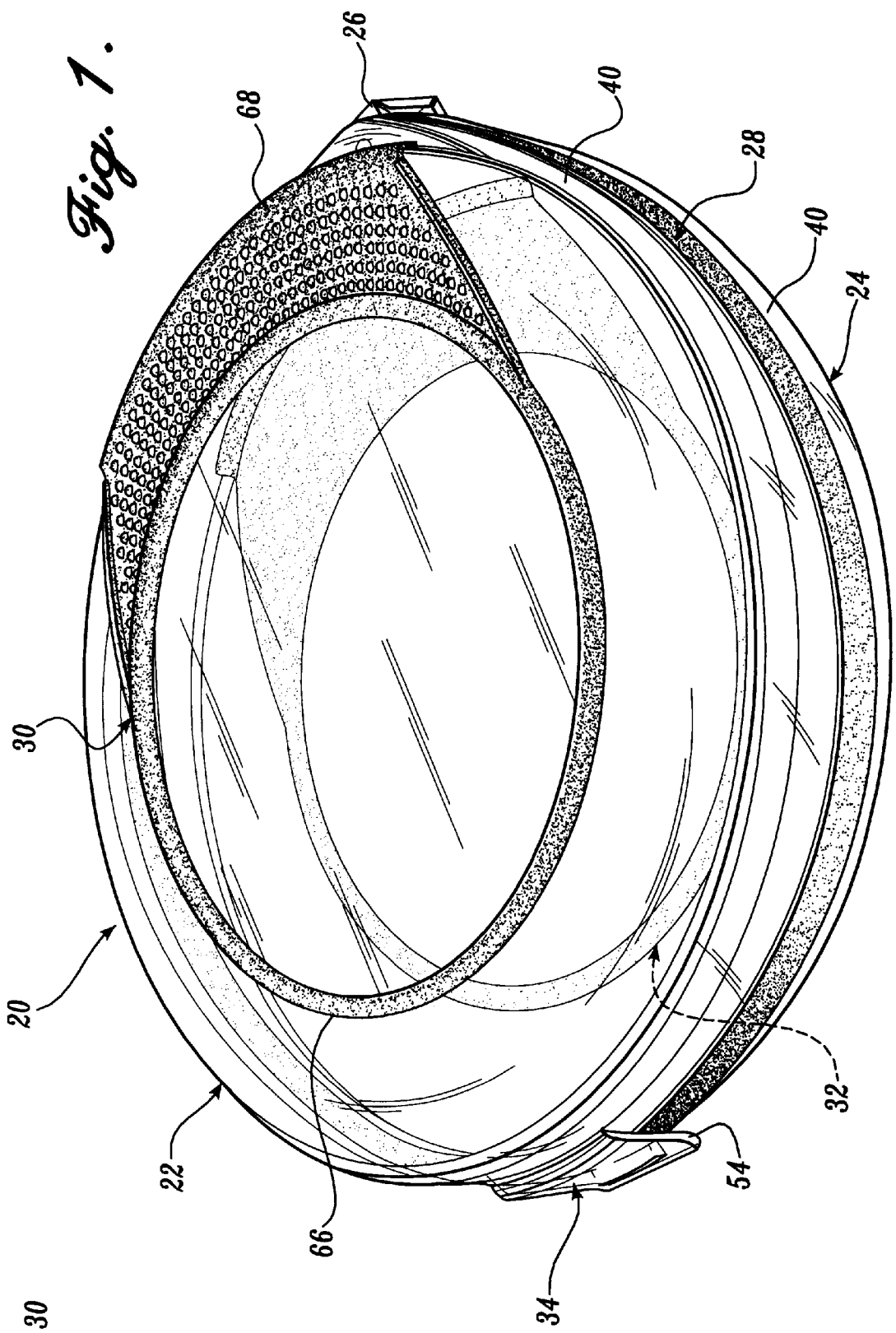
FIG. 1 is an environmental view of a portable storage container formed in accordance with the present invention shown in the closed position.
Figure 2:
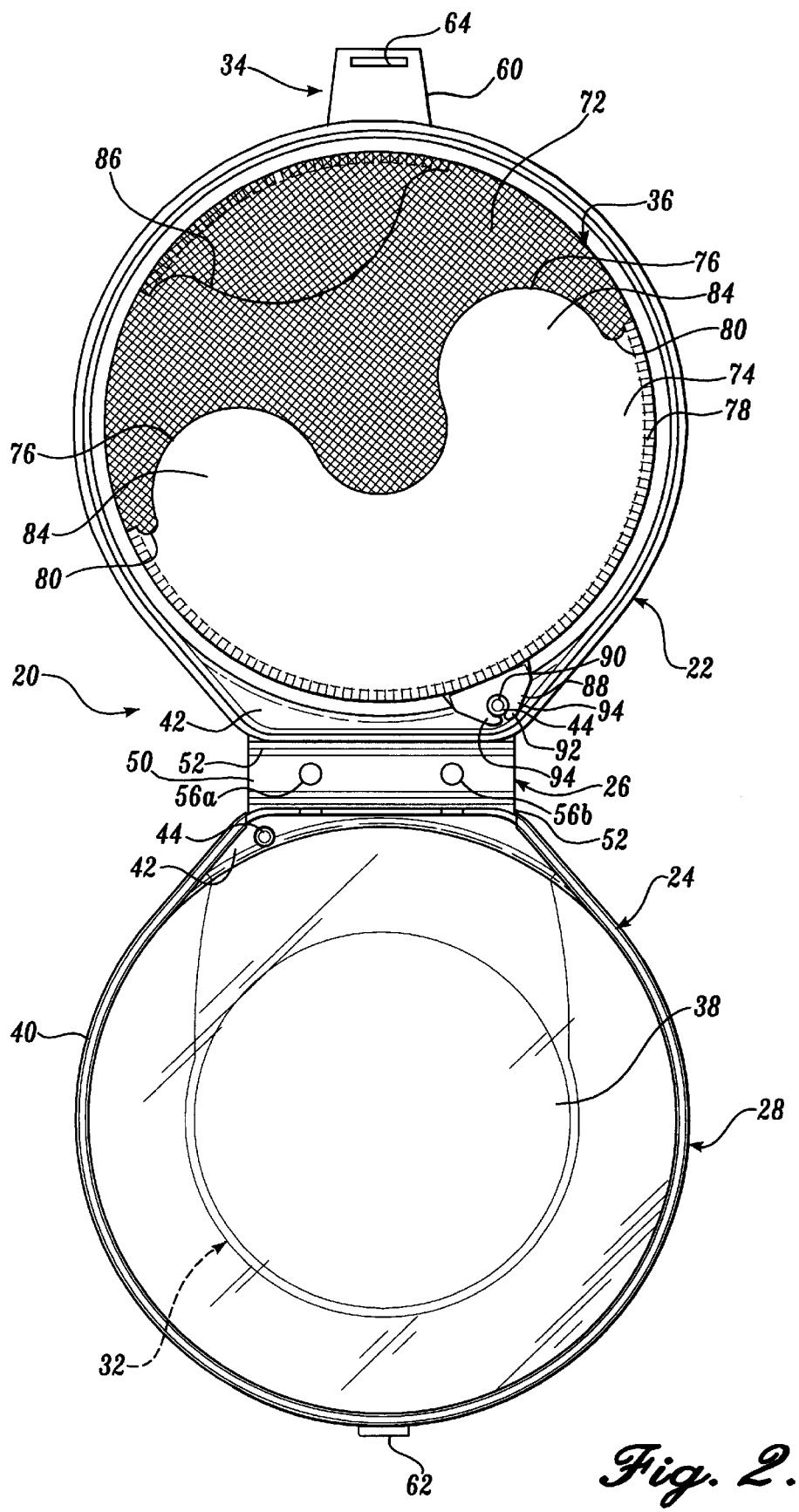
FIG. 2 is a top view of a portable storage container formed in accordance with the present invention shown in the open position.
Figure 3:
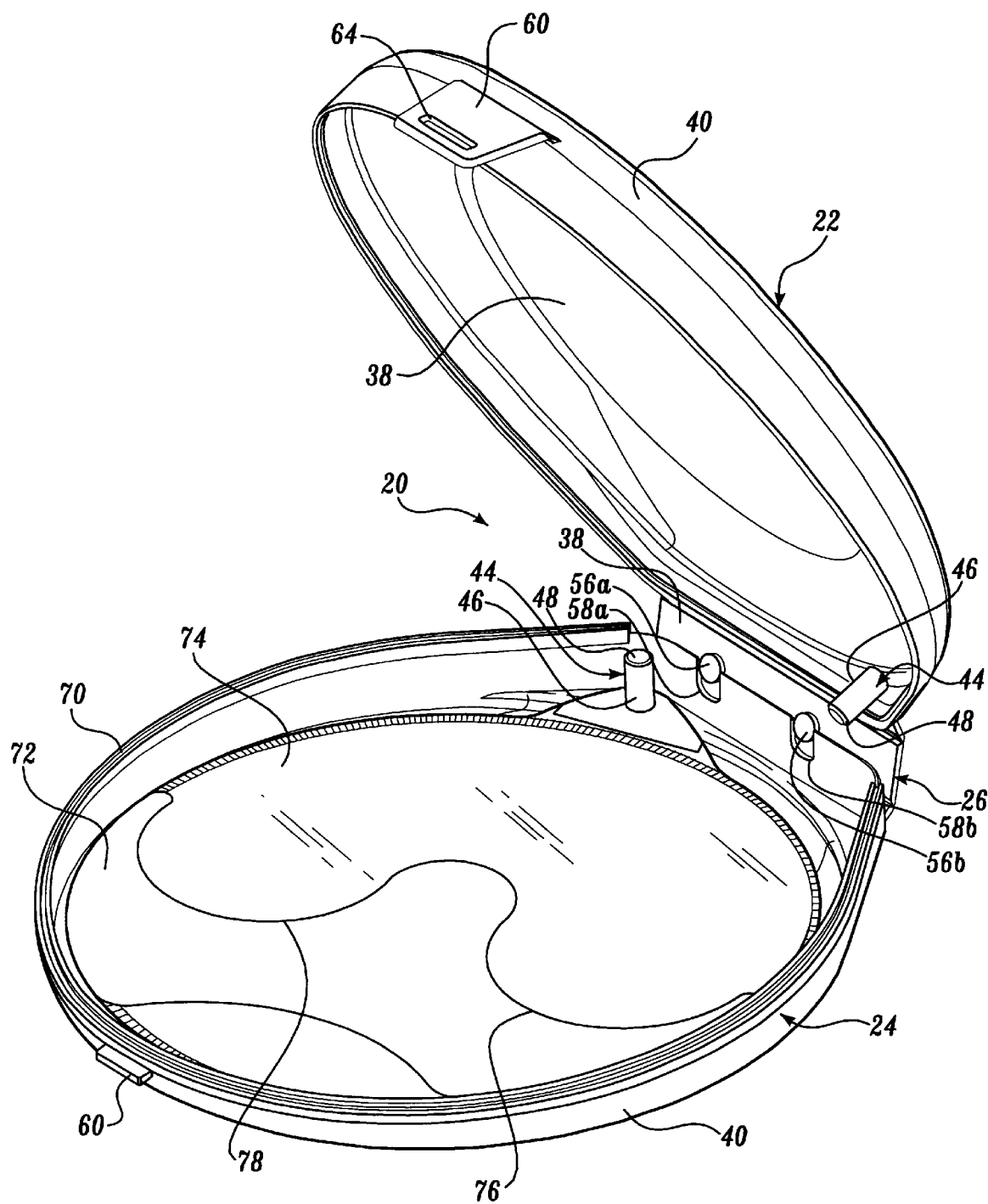
FIG. 3 is a perspective view of a portable storage container formed in accordance with the present invention shown in a partially closed position.

FIGS. 1–3 illustrate a preferred embodiment of a portable storage container 20 constructed in accordance with the present invention. The storage container 20 includes first and second shell portions 22 and 24, a hinge connector 26, a sealing surface 28 and first and second gripping surfaces 30 and 32. The storage container 20 also includes a latch assembly 34 and a plurality of interior envelopes 36. For clarity of the invention and ease of illustration, the plurality of envelopes 36 have not been illustrated in FIG. 1.

The first and second shell portions 22 and 24 are suitably injection molded form a thermoplastic and include a preferably substantially circular central portion 38. The diameter of the central portion 38 is sized to be slightly greater than the diameter of a substantially planar media, such as a compact disc "CD." Each central portion 38 is bounded by an exterior wall 40, such that each exterior wall 40 is located around the external periphery of most of the central portion 38. The height of the two exterior walls 40 is selected to provide the desired internal volume of the storage container 20 to hold a predetermined number of CDs therein.

Integrally formed with the interior of each shell portion 22 and 24 is a pin base 42. The pin base 42 is an area that is raised relative to each central portion 38 and projects outwardly from part of the central portion 38. The pin base 42 includes two substantially triangular portions bounded by the arcuate periphery of the central portion at its interior and by the exterior wall 40 at its exterior. The exterior wall 40 has a linear orientation along the exterior of the pin base 42. The circular configuration of the central portion 38, with the pin base 42 located adjacent a portion of the periphery of the central portion 38, and with the exterior wall 40 bounding the circular periphery of the central portion 38, except at the location of the pin base 42, results in first and second shell portions 22 and 24 being substantially scalloped shaped. Extending upwardly from each pin base 42 is a pin 44. The pins 44 are located on the triangular portion of each pin base 42. Each pin 44 includes a shaft 46 and a head 48 having a diameter greater than that of the shaft 46. Although a single pin 44 extending upwardly from each pin base 42 is preferred, other configurations, such as two pins extending upwardly from each pin base, are also within the scope of the present invention.

The hinge connector 26 connects the first and second shell portions 22 and 24 and permits opening and closing of the storage container 20. The hinge connector 26 is an elongate member and includes a central section 50 and two exterior sections 52. Each exterior section 52 is attached to a portion of the exterior wall 40 of one of the first and second shell portions 22 and 24 where the exterior wall 40 is linear and bounds the pin base 42. The thickness of the hinge connector 26 is less at the two points of connection of the central section 50 to the exterior sections 52 then the thickness of the hinge connector 26 at the central section 50 and exterior sections 52. Thus, opening and closing of the storage container 20 is facilitated by pivoting movement of the first and second shell portions 22 and 24 at the point of attachment of the central section 50 to the exterior sections 52 of the hinge connector 26. The hinge connector 26 is suitably integrally formed with the first and second shell portions 22 and 24. Although an integrally formed hinge connector is preferred, other types of hinge connectors, such as a pin joint, are also within the scope of the present invention.

The latch assembly 34 is located on the exterior of the storage container 20 and is suitably diametrically opposed to the location of the hinge connector 26. The latch assembly 34 includes a tab 60 and a rib 62. In a preferred embodiment, the tab 60 is located on the first shell portion 22 and the rib 62 is located on the second shell portion 24. The rib 62 is an elongate protrusion that is aligned to mate with a slot 64 of the tab 60.

As may be seen by referring to FIG. 3, the latch assembly 34 includes an alignment assembly 54. The alignment assembly 54 includes first and second pegs 56a and 56b and corresponding U-shaped notches 58a and 58b. The pegs 56a and 56b extend upwardly from the central section 50 of the hinge connector 26. The notches 58a and 58b extend through a portion of the exterior wall 40 of the second shell portion 24. Suitably, the notches 58a and 58b are located near the hinge connector 26 and are sized to receive one of the pegs 56a and 56b therein. The pegs 56a and 56b and notches 58a and 58b are located to facilitate alignment of the first shell portion 22 with the second shell portion 24 when the storage container 20 is placed into the closed position. When the storage container 20 is placed into the closed position, the pegs 56a and 56b of the alignment assembly 54 are received within each of the respective notch 58a and 58b to guide the closure of the first shell portion 22 against the second shell portion 24. More specifically, the notches 58a and 58b are positioned on the second shell portion 24, such that as the storage container 20 is placed into the closed position, the perimeter rim of the first shell portion 22 aligns with the perimeter rim of the second shell portion 24.

The latch assembly 34 is located on the exterior of the storage container 20 and is preferably diametrically opposed to the location of the hinge connector 26. The latch assembly 34 includes a tab 60 and a rib 62. Suitably, the tab 60 is located on the first shell portion 22 and the rib 62 is located on the second shell portion 24. The tab 60 includes a slot 64. The rib 62 is an elongate protrusion that is aligned mate with the slot 64 of the tab 60. The rib 62 includes a nub that provides a snap fit with the slot 64 of the tab 60. As with the first and second shell portions 22 and 24, the latch assembly 34 is suitably formed of a synthetic polymer, preferably plastic, such that the attachment of the tab 60 to the shell portions 22 or 24 is by plastic of a lessor thickness than the thickness of the tab 60. As a result, the tab 60 can pivot with respect to the shell portion 22 or 24 on which it is attached, such that the slot 64 of the tab 60 can removably engage the rib 62 to selectively clasp and unclasp the latch assembly 34.

Still referring to FIG. 3, the sealing surface 28 will now be described in greater detail. The sealing surface 28 is suitably comolded from a tactile polymer, such as a thermo plastic elastomer, to the perimeter rim portion of the second shell portion 24. The sealing surface 28 includes a channel 70 extending the length of the sealing surface 28, such that as attached to the second shell portion 24, the channel 70 extends around the perimeter rim of the second shell portion 24. The channel 70 is sized to sealingly receive the perimeter rim of the first shell portion 22 when the storage container 20 is in the closed position. Although it is preferred that the sealing surface 28 be comolded to the second shell portion 24, it should be apparent that the sealing surface 28 may be comolded to the first shell portion 22.

As may be best seen by referring to FIG. 1, the first and second gripping surfaces 30 and 32 will now be described in greater detail. The first and second gripping surfaces 30 and 32 are identically configured and, as a result, only the first gripping surface 30 will be described in greater detail. However, it should be apparent that the description for the first gripping surface 30 is applicable to the second gripping surface 32.

The first gripping surface 30 is suitably formed from a polypropylene and is preferably comolded to the exterior surface of the first and second shell portions 22 and 24. The first gripping surface 30 includes an annular portion 66 and a substantially rectangular stem portion 68. The annular portion 66 is centrally located on the exterior surface of the first shell portion 22. The stem portion 68 is integrally formed with one end of the annular portion 66 and extends towards the hinge connector 26. As formed on the exterior surfaces of the first and second portions 22 and 24, the gripping portions 30 and 32 provide a solid gripping surface for either an end user or for storage on a surface, such as a dashboard of an automobile. Although two gripping surfaces is preferred, it should be apparent that a storage container having a single gripping surface is also within the scope of the present invention.

Referring to FIGS. 2 and 3, the envelope 36 will now be described in detail. As noted above, a plurality of envelopes 36 are removably insertable in the storage container 20 of the present invention. Each envelope 36 is comprised of a substantially circular backing 72 preferably comprised of a lightweight, flexible and sturdy material. The backing 72 is sized to have an external diameter slightly greater than the compact disc or other electronic storage medium to be contained within the envelope 36. The envelope 36 also includes a fore layer 74. The fore layer 74, comprised of a thin yet strong synthetic polymer and is substantially semicircular, having an arcuate exterior edge 76 that is affixed to the backing 72 by stitching or heat welding, thereby defining a seam 78. Each end of the exterior edge 76 near the seam 78 also includes a notch 80. Each notch 80 is located a predetermined distance from the seam 78, such that when a media disk, such as a CD, is inserted into and out of the envelope 36, flexure of the fore layer 74 does not cause increased stress at the seam 78 and, therefore, premature wear of the fore layer 74.

The fore layer 74 also has an interior edge 82 that is sinusoidal in shape, such that fore layer 74 has two laterally disposed lobes 84 between which the center hole of a compact disc inserted in the envelope 36 is accessible. As a result, an end user can insert and remove the compact disc from the envelope 36 by placing a thumb in the center hole of the compact disc such that the data access side of the compact disc is not handled, as will be explained further below.

Each envelope 36 also includes a grip portion 86 and an attachment tab 88. The grip portion 86 is affixed to the periphery of the backing 72 at a location preferably diametrically opposite to the orientation of the fore layer 74 on the backing 72. The grip portion 86 is preferably comprised of a thin synthetic polymer layer having strength and flexibility, and is fixedly attached to backing 72 by stitching or heat welding, for example. The grip portion 86 preferably has a shape defined by its periphery being comprised of two complementary arcuate segments.

To insert a compact disc in the envelope 36, the envelope 36 is held in one of the user's hands and the compact disc is held in the other, with the user's thumb inserted in the center hole of the compact disc and the user's fingers grasping a portion of the edge of the compact disc. The compact disc is slipped between the backing 72 and the fore layer 74. The central depression of fore layer 74 bounded by lobes 84 allows the user's thumb to remain in the center hole of the compact disc while the disc is fully inserted between the backing 72 and the fore layer 74 without the user's thumb contacting fore layer 74. Next, the user's thumb is removed from the center hole of the compact disc and the user grasps the grip portion 86 between thumb and forefinger. The grip portion 86 is then placed over the edge of the compact disc that is opposite from the edge that has nested between the backing 72 and fore layer 74. The compact disc is now securely held within the envelope 36.

To remove the compact disc from the envelope 36, the above process is reversed. More specifically, the grip portion 86 is grasped between thumb and forefinger and the grip portion 86 is drawn away from the exterior edge of the compact disc. Next, the user's thumb is inserted into the center hole of the compact disc and the user's fingers grasp the exterior edge of the compact disc remote from fore layer 74. The compact disc is then drawn out of the backing 72 and the fore layer 74. Alternatively, the compact disc is not drawn out of the backing 72 and the fore layer 74. Instead, the exterior edge of the compact disc, freed from the grip portion 86, is inserted into the compact disc reading apparatus, which draws the remainder of the compact disc out from between the backing 72 and the fore layer 74. In this manner, the compact disc is not touched by the user's hands and thus remains free from dirt, body oils, and scratches.

The attachment tab 88 is fixedly secured to the outer periphery of backing 72 by, for example, heat welding, at a location preferably diametrically opposite to the location of grip portion 86 on backing 72. The attachment tab 88 preferably has a frusto-pyramidal cross section and a pin orifice 90 centrally located therein. Slit 92, starting at the truncated apex of the attachment tab 88, terminates at pin orifice 90. The slit 92 thus defines the outer extent of the two arms 94 of the attachment tab 88.

The attachment tab 88 is preferably comprised of a synthetic polymer, preferably a plastic, that is structurally rigid but has sufficient flexing qualities to allow relative movement between arms 94 for attachment of the attachment tab 88 to, and removal of attachment tab 88 from, one of pins 44 of the storage container 20. More specifically, in order to access a compact disc in an envelope 36 located in the storage container 20, the desired envelope 36 is first removed from storage container 20 by pulling firmly on the envelope 36 adjacent the grip portion 86 thereof in a direction perpendicular to the longitudinal axis of the pin 44. The aforesaid force causes arms 94 of the attachment tab 88 to separate, allowing the pin 44 to pass through the slit 92 of the attachment tab 88, thus separating the envelope 36 from the storage container 20. The desired compact disc is then removed from the envelope 36 in the manner previously described above.

As noted above, when removing the envelope 36 from the storage container 20 by separating the attachment tab 88 from the pin 44, a force substantially perpendicular to the longitudinal axis of the pin 44 is applied to the envelope 36. However, when replacing the now empty envelope 36 in the storage container 20 for storage and safe keeping, the attachment tab 88 is reattached to the pin 44 by orienting the pin orifice 90 over the pin 44 and pressing downwardly on the attachment tab 88 with a force parallel to the longitudinal axis of the pin 44. As a result, the arms 94 of the attachment tab 88 separate to accommodate passage of the pin orifice 90 over the head 48 of the pin 44. After the pin orifice 90 has passed over the head 48, the arms 94 return to their original configuration due to the resilient qualities of the attachment tab 88, such that the pin orifice 90 surrounds the shaft 46 of the pin 44.

When a compact disc is to be replaced into an empty envelope 36, the empty envelope 36 is again pulled with a force perpendicular to the longitudinal axis of pin 44 as described above. After the compact disc has been replaced in the envelope 36 in the manner described above, the envelope 36, now containing the compact disc, is again attached to the storage container 20 by pushing the attachment tab 88 down onto the pin 44 with a force substantially parallel to the longitudinal axis of the pin 44, such that the pin orifice 50 passes over the head 48 of the pin 44 and surrounds the shaft 46 of the pin 44.

Figure 4:
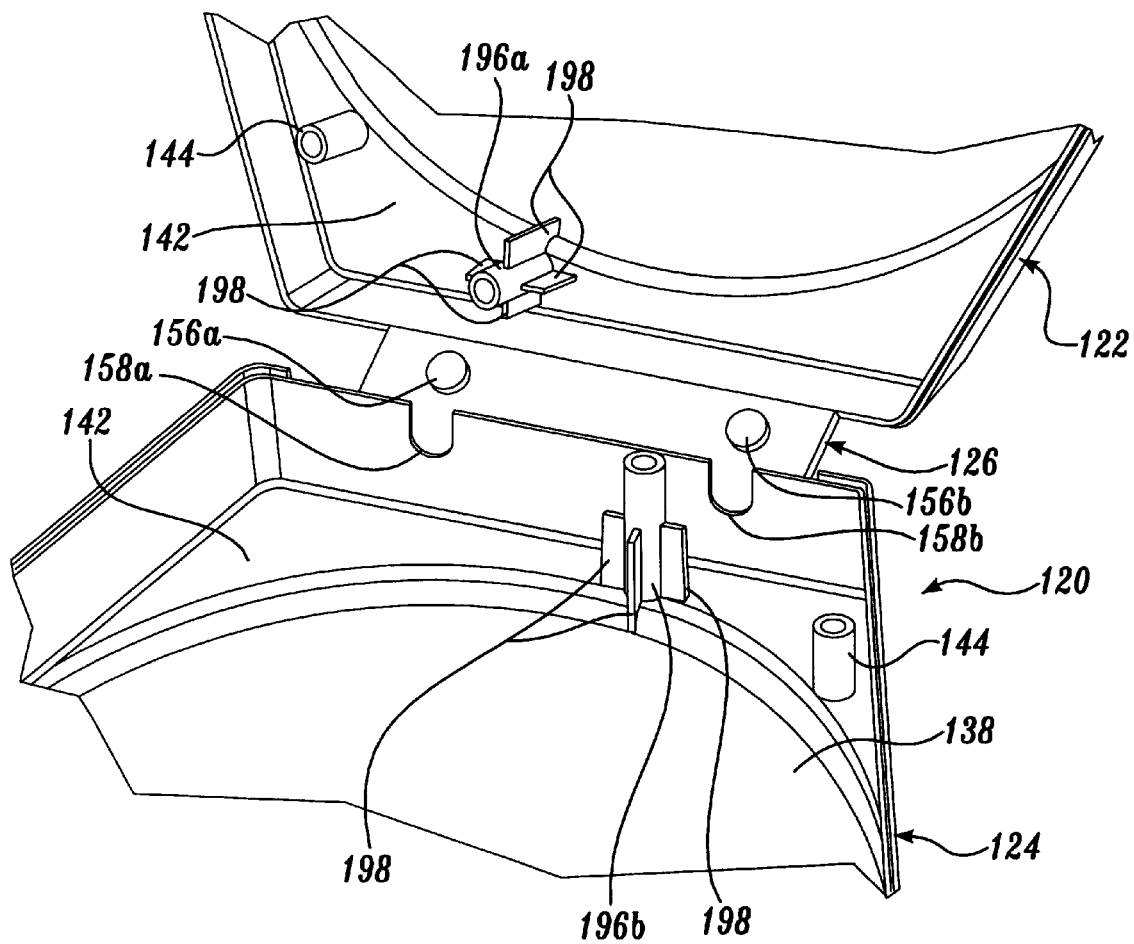
FIG. 4 is a partial perspective view of an alternate embodiment of a portable storage container formed in accordance with the present invention.

Referring to FIG. 4, an alternate embodiment of the portable storage container 120 formed in accordance with the present invention will now be described in greater detail. The portable storage container 120 is identical in materials and operation as the preferred embodiment described above with the following exception. As seen best in FIG. 4, the storage container 120 includes third and fourth pins 196a and 196b adapted to receive at least one envelope. The third and fourth pins 196a and 196b project upwardly from the pin base 142 of the first and second shell portions 122 and 124. Suitably, the third and fourth pins 196a and 196b are integrally formed with the pin base 142. Preferably, the fourth pin 196 is longer than the other pins of the storage container 120, and may be as much as twice as high as the pins 144.

The third and fourth pins 196a and 196b also include integrally formed ribs 198. The ribs 198 extend radially outward from the outside perimeter of each pin 196a and 196b and extend from the pin base 142 for a predetermined distance along the length of the pins 196a and 196b. Suitably, the ribs 198 extend halfway up the length of the pins 196a and 196b. The tops of the ribs 198 define a resting point for a predetermined number of envelopes described above. In one embodiment, a total of five additional envelopes may be stacked in each one of the pins 196a and 196b. Additionally, the ribs 198 stiffen each pin 196a and 196b.

Referring next to FIG. 5, a second alternate embodiment of a portable storage container 220 formed in accordance with the present invention will now be described in greater detail. The portable storage container 220 of the second alternate embodiment is identical in materials and operation to the preferred embodiment described above with the following exception. As seen in FIG. 5, a first storage container 220 is stackable on a second storage container 320. The first and second storage containers 220 and 320 are identically configured and, as a result, only the first storage container 220 will be described in greater detail. However, it should be apparent that the description for the first storage container 220 is applicable to the second storage container 320.

The first and second gripping surfaces 220 and 232 each include an annular portion 226 and 227. In the second alternate embodiment, the annular portion 226 of the first gripping surface 230 has a diameter that is less than the diameter of the annular portion 267 of the second gripping surface 232 by predetermined amount. Preferably, the diameter of the first annular portion 266 is less than the diameter of the second portion 267, such that the first annular portion 266 is snugly received within the inside diameter of the second annular portion 267. As a result, two or more portable storage containers formed in accordance with the present invention are stackable one upon the other.

From the foregoing description, it may be seen that a portable storage container formed in accordance with the present invention incorporates many novel features and offers significant advantages over currently available containers. While the presently preferred embodiments of the invention have been illustrated and described, it is to be understood that within the scope of the appended claims, various changes can be made therein without departing from the spirit and scope of the invention. As a nonlimiting example, the sealing surface may be configured as a lip sized to cover and seal the joint between the first and second shell portions in the closed portion. As a result, it should be appreciated that various changes can be made to the embodiments of the invention without departing from the spirit and scope of the invention.

The embodiments of the invention in which an exclusive property or privilege is claimed defined as follows:

1. A portable storage container for storing substantially planar media, the portable storage container comprising:
   (a) first and second shell halves, each shell half having an exterior, an interior, and a perimeter rim portion;
   (b) a connector extending between a portion of the first and second shell halves to foldably couple the first and second shell halves, the first and second shell halves selectively foldable between a closed position, wherein the interiors of the first and second shell halves oppose each other, and an open position;
   (c) an alignment assembly disposed on the portable storage container to facilitate alignment of the perimeter rim portions of the first and second shell halves in the closed position; and
   (d) a first envelope sized to be selectively received within at least one of either the first or second shell halves, the first envelope adapted to store a substantially planar media.

2. The portable storage container of claim 1, further comprising a first peg disposed within the interior of at least one of either the first or second halves, the first peg having a length and sized to selectively fasten the first envelope within the portable storage container.

3. The portable storage container of claim 2, further comprising a second peg disposed within the interior of other of either the first or second shell halves, the second peg having a length and sized to selectively fasten a second envelope within the portable storage container.

4. The portable storage container of claim 1, further comprising a first gripping surface fastened to the exterior of at least one of the first or second shell halves.

5. The portable storage container of claim 4, further comprising a second gripping surface fastened to the exterior of the other of the first or second shell halves.

6. The portable storage container of claim 5, wherein the first and second gripping surfaces are comolded to the exteriors of the first and second shell halves.

7. The portable storage container of claim 5, wherein the first gripping surface includes a first annular portion having an outside diameter, the second gripping surface includes a second annular portion having an inside diameter, wherein the inside diameter of the second annular portion is larger than the outside diameter of the first annular portion by a predetermined amount, such that the first annular portion may be nested within a second annular portion of a second portable storage container.

8. The portable storage container of claim 1, further comprising a sealing surface fastened to one of the perimeter rim portions of either the first or second shell halves, the sealing surface sized to sealing receive the perimeter rim portion of the other of the first or second shell halves.

9. The portable storage container of claim 1, wherein the alignment assembly includes a first peg extending from the connector and a first slot integrally formed in the perimeter rim portion of one of the first or second shell halves, the first slot sized to received the first peg therein when the first and second shell halves are in the closed position to ensure alignment of the first and second shell halves and facilitate closing the first and second shell halves.

10. The portable storage container of claim 1, wherein the first envelope includes a sleeve fastened to one side of the first envelope by a seam, the sleeve sized to receive a substantially planar media between the one side of the first envelope and the sleeve.

11. The portable storage container of claim 10, wherein the sleeve includes first and second notches located a predetermined distance from the seam, the first and second notches are located on opposites sides of the sleeve, the notches permit repeated deposit and removal of a substantially planar media from the first envelope.

12. The portable storage container of claim 3, further comprising third and fourth pegs disposed within the interior of the first and second shell halves, at least one of the third or fourth pegs having a length greater than the length of the first and second pegs.

13. A portable storage container for storing substantially planar media, the portable storage container comprising:
 (a) first and second shell halves, each shell half having an exterior, an interior, and a perimeter rim portion;
 (b) a connector extending between a portion of the first and second shell halves to foldably couple the first and second shell halves, the first and second shell halves selectively foldable between a closed position, wherein the interiors of the first and second shell halves oppose each other, and an open position;
 (c) an alignment assembly disposed on the portable storage container to facilitate alignment of the perimeter rim portions of the first and second shell halves in the closed position;
 (d) a first envelope sized to be selectively received within at least one of either the first or second shell halves, the first envelope adapted to store a substantially planar media; and
 (e) a sealing surface fastened to one of the perimeter rim portions of either the first or second shell halves, the sealing surface sized to sealing receive the perimeter rim portion of the other of the first or second shell halves.

14. The portable storage container of claim 13, further comprising a first peg disposed within the interior of at least one of either the first or second shell halves, the first peg sized to selectively fasten the first envelope within the portable storage container.

15. The portable storage container of claim 13, further comprising a first gripping surface fastened to the exterior of at least one of the first or second shell halves.

16. The portable storage container of claim 13, wherein the alignment assembly includes a first peg extending from the connector and a first slot integrally formed in the perimeter rim portion of one of the first or second shell halves, the first slot sized to received the first peg therein when the first and second shell halves are in the closed position to ensure alignment of the first and second shell halves and facilitate closing the first and second shell halves.

17. The portable storage container of claim 13, wherein the first envelope includes a sleeve fastened to one side of the first envelope by a seam, the sleeve sized to receive a substantially planar media between the one side of the first envelope and the sleeve.

18. The portable storage container of claim 17, wherein the sleeve includes first and second notches located a predetermined distance from the seam, the first and second notches are located on opposites sides of the sleeve, the notches permit repeated deposit and removal of a substantially planar media from the first envelope.

19. A portable storage container for storing substantially planar media, the portable storage container comprising:
 (a) first and second shell halves, each shell half having an exterior, an interior, and a perimeter rim portion;
 (b) a connector extending between a portion of the first and second shell halves to foldably couple the first and second shell halves, the first and second shell halves selectively foldable between a closed position, wherein the interiors of the first and second shell halves oppose each other, and an open position;
 (c) an alignment assembly disposed on the portable storage container to facilitate alignment of the perimeter rim portions of the first and second shell halves in the closed position;
 (d) a first envelope sized to be selectively received within at least one of either the first or second shell halves, the first envelope adapted to store a substantially planar media;
 (e) a sealing surface fastened to one of the perimeter rim portions of either the first or second shell halves, the sealing surface sized to sealing receive the perimeter rim portion of the other of the first or second shell halves; and
 (f) a first gripping surface fastened to the exterior of at least one of the first or second shell halves.

20. The portable storage container of claim 19, wherein the alignment assembly includes a first peg extending from the connector and a first slot integrally formed in the perimeter rim portion of one of the first or second shell halves, the first slot sized to received the first peg therein when the first and second shell halves are in the closed position to ensure alignment of the first and second shell halves and facilitate closing the first and second shell halves.

21. The portable storage container of claim 19, wherein the first envelope includes a sleeve fastened to one side of the first envelope by a seam, the sleeve sized to receive a substantially planar media between the one side of the first envelope and the sleeve.

22. The portable storage container of claim 21, wherein the sleeve includes first and second notches located a predetermined distance from the seam, the first and second notches are located on opposites sides of the sleeve, the notches permit repeated deposit and removal of a substantially planar media from the first envelope.

* * * * *